US011556400B2

(12) United States Patent
Garza et al.

(10) Patent No.: US 11,556,400 B2
(45) Date of Patent: *Jan. 17, 2023

(54) HANDLING LARGE MESSAGES VIA POINTER AND LOG

(71) Applicant: INTERNATIONAL BUSINESS MACHINES CORPORATION, Armonk, NY (US)

(72) Inventors: Jose Emir Garza, Teddington (GB); Stephen James Hobson, Hampton (GB); Peter Siddall, Romsey (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 16/699,610

(22) Filed: Nov. 30, 2019

(65) Prior Publication Data

US 2020/0145359 A1 May 7, 2020

Related U.S. Application Data

(63) Continuation of application No. 12/108,545, filed on Apr. 24, 2008, now Pat. No. 10,567,322.

(30) Foreign Application Priority Data

May 22, 2007 (EP) .................................... 07108664

(51) Int. Cl.
 *G06F 9/54* (2006.01)
(52) U.S. Cl.
 CPC .................................... *G06F 9/544* (2013.01)

(58) Field of Classification Search
 CPC .......... H04L 51/14; H04L 51/34; G06F 9/544
 See application file for complete search history.

(56) References Cited

U.S. PATENT DOCUMENTS

| 5,052,040 | A | 9/1991 | Preston |
| 5,347,633 | A | 9/1994 | Ashfield |
| 5,452,430 | A | 9/1995 | Dievendorff |
| 6,353,834 | B1 | 3/2002 | Wong |
| 6,574,792 | B1 | 6/2003 | Easton |
| 6,915,457 | B1 | 7/2005 | Miller |
| 7,028,153 | B1 | 4/2006 | Noble |
| 2002/0144010 | A1* | 10/2002 | Younis ................... G06F 9/546 |
| | | | 719/314 |
| 2003/0105654 | A1* | 6/2003 | MacLeod ............... G06Q 10/10 |
| | | | 709/223 |
| 2003/0163539 | A1 | 8/2003 | Piccinelli |

(Continued)

*Primary Examiner* — S. Sough
*Assistant Examiner* — Carina Yun
(74) *Attorney, Agent, or Firm* — Cuenot, Forsythe & Kim, LLC

(57) ABSTRACT

A computer system with a first messaging application communicates a message to another computer system with a second messaging application via a coupling facility storage device. If the message does not exceed a predetermined threshold, the message is put onto the queue in the coupling facility. If the message does exceed a predetermined threshold, the message is put onto a log associated with the first messaging application and readable by the second messaging application. A pointer to the message is put onto the queue in the coupling facility. The pointer can be used to access the message in the log.

18 Claims, 4 Drawing Sheets

(56) References Cited

U.S. PATENT DOCUMENTS

| | | | |
|---|---|---|---|
| 2003/0217119 A1* | 11/2003 | Raman | H04L 67/1097 709/219 |
| 2005/0223282 A1 | 10/2005 | Frey | |
| 2006/0200516 A1 | 9/2006 | Flaherty | |
| 2007/0283194 A1 | 12/2007 | Villella | |
| 2008/0294661 A1 | 11/2008 | Garza | |

* cited by examiner

HANDLING LARGE MESSAGES VIA POINTER AND LOG

BACKGROUND OF THE INVENTION

The present invention relates to message handling.

In message handling systems, it is known to provide a mechanism to store shared messages using a coupling facility comprising an associated queue as the shared storage.

The use of a coupling facility provides for high availability as even if a component (e.g. messaging software) associated with a computer system connected to the coupling facility fails, messaging software residing on other computer systems can still access the coupling facility. Furthermore, a coupling facility is fast, providing for improved performance.

However, the relative cost of such storage makes its use for storing large messages prohibitive.

Furthermore, some coupling facilities have a cap associated with size of a message, such that messages having a size exceeding the cap cannot be stored in the coupling facility.

One solution to this problem is detailed in US-2006-0200516-A1 wherein a data processing system for message handling comprises a coupling facility for receiving messages, the coupling facility arranged to maintain a queue of messages, and a database for storing messages. A component, such as a server, of the system is arranged to detect that a message is of a size above a predetermined threshold, and stores this larger message in the database and enters a proxy in the queue of messages.

SUMMARY OF THE INVENTION

According to a first aspect, there is provided an apparatus for message handling for use with a system comprising: a storage device for receiving a message and a log associated with a first messaging application for storing a message, the apparatus comprising: an interceptor for intercepting a message before it is received in the storage device; a comparator for comparing a size associated with the message against a predetermined threshold; a generator, responsive to the size exceeding the predetermined threshold, for generating a pointer associated with the message; means for storing the pointer in the storage device; and means for storing the message in the log.

According to a second aspect, there is provided a method for message handling for use with a system comprising: a storage device for receiving a message and a log associated with a first messaging application for storing a message, the method comprising the steps of: intercepting a message before it is received in the storage device; comparing a size associated with the message against a predetermined threshold; generating, in response to the size exceeding the predetermined threshold, a pointer associated with the message; storing the pointer in the storage device; and storing the message in the log.

According to a third aspect, there is provided a computer program comprising program code means adapted to perform all the steps of the method described above when said program is run on a computer.

BRIEF DESCRIPTION OF THE DRAWINGS

The present invention will now be described, by way of example only, with reference to embodiments thereof, as illustrated in the following drawings.

DETAILED DESCRIPTION OF THE INVENTION

An embodiment will now be described with reference to the figures.

Figure 1:
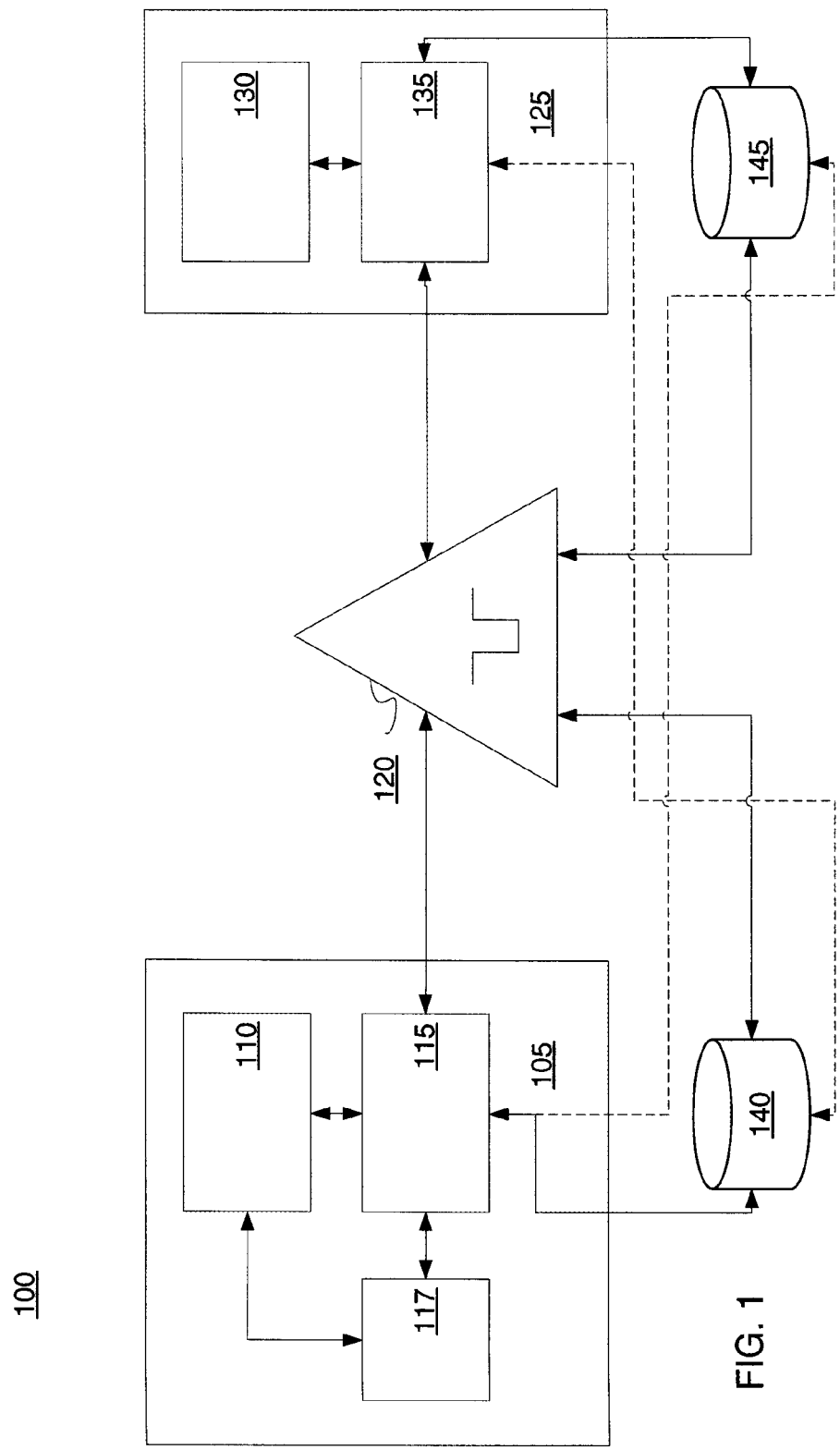
FIG. 1 is a block diagram of an improved system for message handling.

FIG. 1 depicts a system (100) for message handling. The system (100) comprises a coupling facility (120) arranged to maintain a queue for storing messages. The system (100) further comprises a first computer system (105) and a second computer system (125) operable to connect to the coupling facility (120).

The system (100), in its hardware implementation may consist of several interconnected computer systems, or may consist of a single computer system with different logical functions being carried out by different parts of the computer system.

The first computer system (105) comprises a first application (110), a first messaging application (115) (e.g. comprising a queue manager) and an apparatus (117) of the embodiment. The second computer system (125) comprises a second application (130) and a second messaging application (135) (e.g. comprising a queue manager). Preferably, the second computer system (125) can also comprise an apparatus of the embodiment; however, this has not been depicted in FIG. 1 for clarity.

Figure 2:
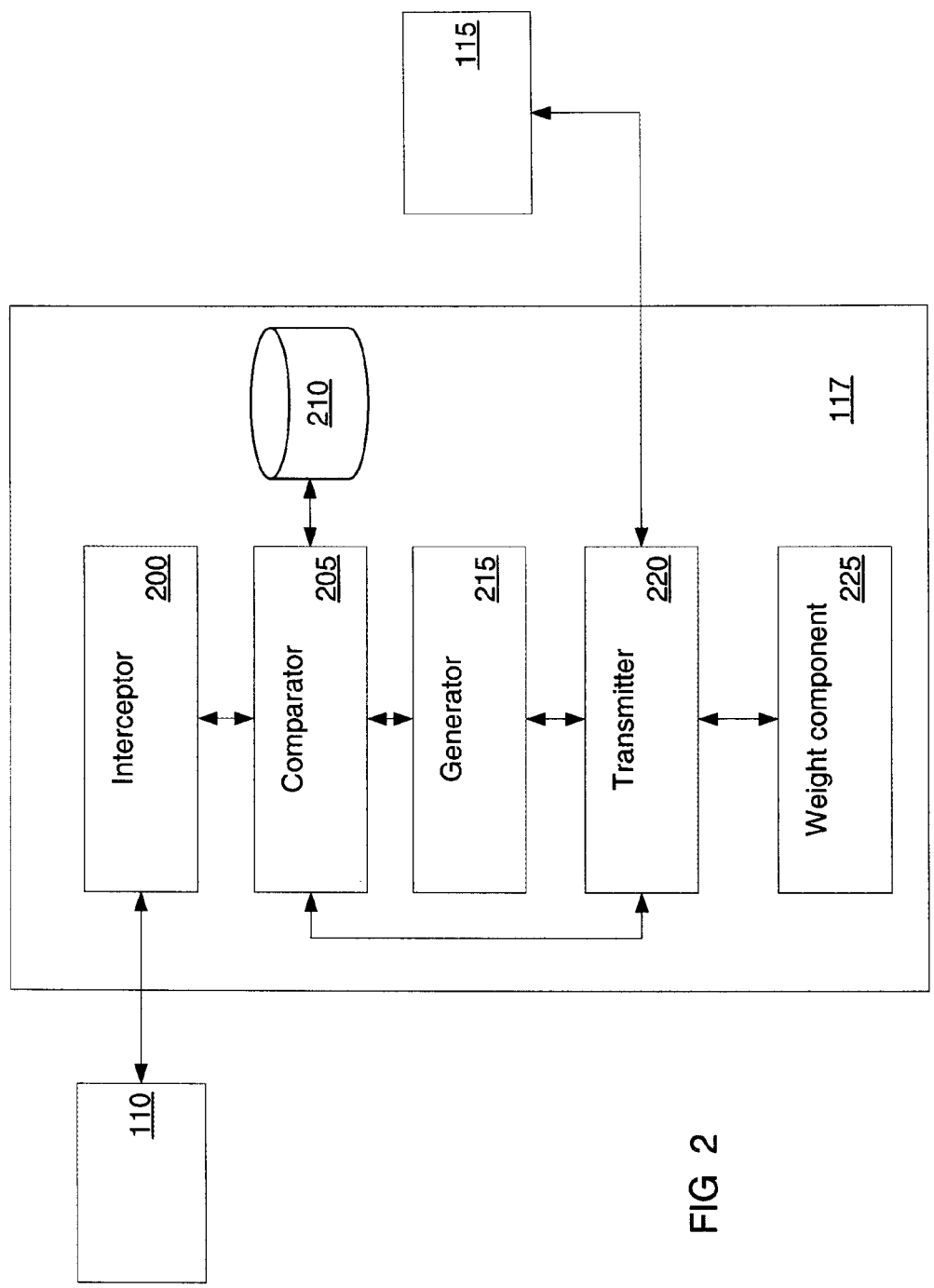
FIG. 2 is a block diagram of an apparatus of the preferred embodiment.

The apparatus (117) is shown in more detail in FIG. 2, wherein an interceptor (200) is operable to communicate with the application (110); a comparator (205) is operable to communicate with the interceptor (200) and a storage component (210) which is operable to store a pre-configurable threshold; a generator (215) is operable to communicate with the comparator (205); a transmitter (220) is operable to communicate with the first messaging application (115), the comparator (205) and the generator (215); and a weight component (225) is operable to communicate with the transmitter (220).

In the example herein, the first application (110) is operable to generate one or more messages which are placed ("put") on the queue within the coupling facility (120) by the first messaging application (115). The second messaging application (135) is operable to call ("get") a message from the queue, when it is in a position to carry out the work entailed by the message.

Typically, the first messaging application (115) puts a message onto the end of the queue. The second messaging application (135) is operable, when it is a condition to do so, to get the oldest message from the queue.

It should be understood that each of the first messaging application (115) and the second messaging application (135) is operable to put and get messages from the queue.

The first messaging application (115) has an associated first log (140) and the second messaging application (135) has an associated second log (145). Preferably, each log is duplexed for redundancy.

A messaging application typically has read/write access to its own log (shown with a solid line in FIG. 1) and read only access to a log associated with another messaging application (shown with a dashed line in FIG. 1). A messaging application can thus read data from a log of another messaging application. The read can occur whilst the other messaging application continues to write to the log. Advantageously, this allows data to be recovered from a log associated with a failed messaging application, by another messaging application.

A log is often implemented using for example, direct access media, a magnetic disk etc, allowing for rapid access to data in the log based, for example, on the relative byte address (RBA) of the data. Logs are typically sequentially written files and are typically intended for storing data that is time sensitive (e.g. wherein the data is archived, offloaded or overwritten after a period of time). Writing to and reading from a log are typically fast operations.

Some known messaging systems provide for persistent messaging. Typically, when an application generates a persistent message, the persistent message is put on the queue and is also written to a log in persistent storage (e.g. disk). Persistently stored messages are able to survive most failures and restarts of the messaging system. In response to a failure other than a disk failure, the messages can be recovered from the logged data and the queue. If disk failure occurs, preferably, messages are recovered from the backup log.

Preferably, the first messaging application (115) has an associated catalogue comprising data associated with a message (e.g. a message identifier) and data associated with a storage device on which the message is stored (e.g. a log identifier associated with a log; an offload storage device identifier associated with an offload storage device). Preferably, the second messaging application (135) also has an associated catalogue.

A process of an embodiment will now be described with reference to the FIGS. 3A and 3B.

Figure 3A:
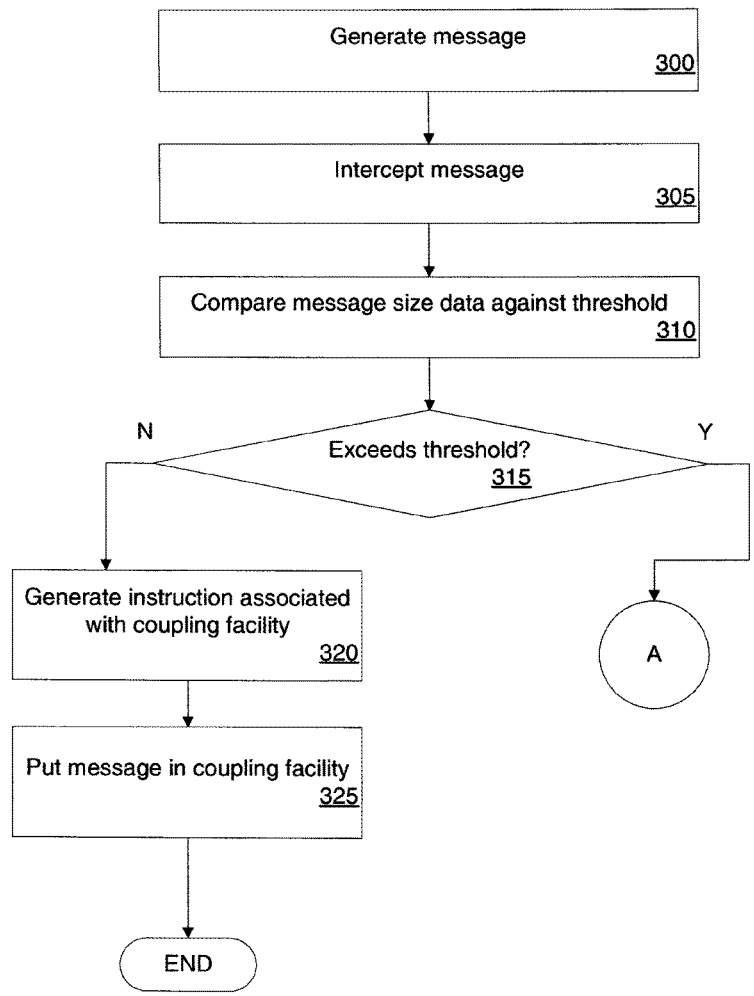
FIGS. 3A and 3B are a flow chart showing the operational steps involved in a message handling process.

Referring to FIG. 3A, at step 300, the first application (110) generates a message. Preferably, the message can be persistent or non-persistent. The first application (110) passes the message to the first messaging application (115), however, before the message reaches the first messaging application (115), the interceptor (200) intercepts (step 305) the message.

Preferably, the interceptor (200) passes the message to the comparator (205).

In response to receiving the message, the comparator (205) retrieves size data associated with the message e.g. by parsing the message. In response to retrieving the size data, the comparator (205) compares (step 310) the size data against the threshold stored in the storage component (210). Preferably, the comparator (205) passes the message to the transmitter (220).

In response to the size data not exceeding the threshold, the generator (215) generates (step 320) an instruction for instructing the first messaging application (115) to "put" the message in the queue of the coupling facility (120). The generator (215) is operable to pass the instruction to the transmitter (220).

The transmitter (220) transmits the instruction and the message to the first messaging application (115). In response, the first messaging application (115) uses the instruction to "put" (step 325) the message in the queue of the coupling facility (120). In response, the process ends.

If the second messaging application (135) wishes to "get" the message, the second messaging application (135) retrieves the message from the queue.

Figure 3B:
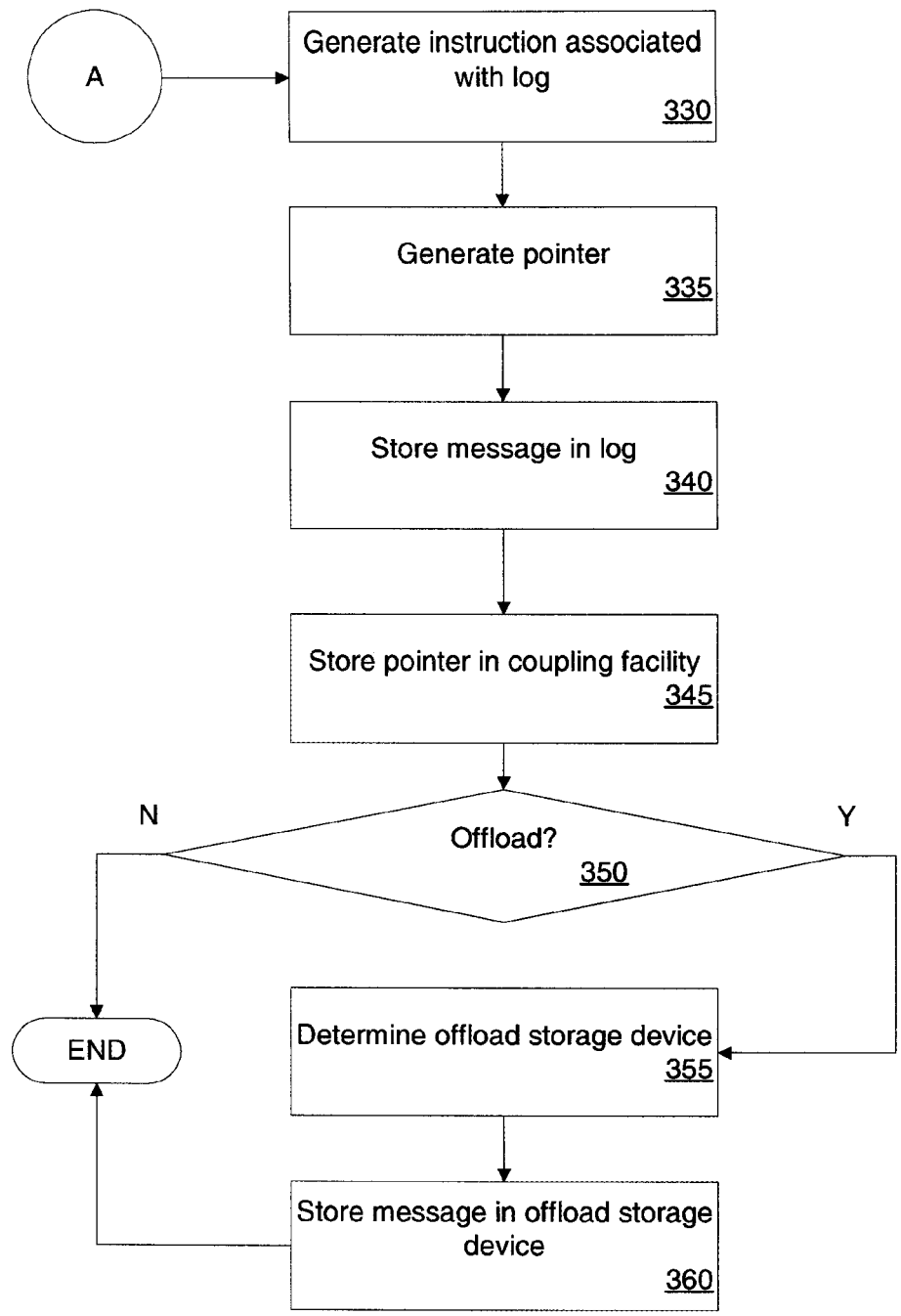

In response to the size data exceeding the threshold, with reference to FIG. 3B, the generator (215) generates (step 330) an instruction for instructing the first messaging application (115) to store the message in the first log (140) and to store a pointer associated with the message in the queue associated with the coupling facility (120).

Preferably, the generator (215) is also operable to generate (step 335) the pointer. Preferably, the pointer comprises data for allowing the message to be retrieved from the first log (140) e.g. a message identifier associated with the message (140) and a catalogue identifier associated with the catalogue of the first messaging application (115).

The generator (215) is operable to pass the instruction and the pointer to the transmitter (220).

The transmitter (220) transmits the instruction, the message and the pointer to the first messaging application (115). In response, the first messaging application (115) uses the instruction to store (step 340) the message in the first log (140) and to store (step 345) the pointer in the queue associated with the coupling facility (120).

Preferably, the pointer is stored in the queue in ordering sequence with respect to at least one of: the message (e.g. wherein the message comprises an associated size that is less than the threshold), or another pointer.

If the second messaging application (135) wishes to "get" the message, the second messaging application (135) retrieves the pointer from the queue and uses the catalogue identifier in the pointer to access the catalogue of the first messaging application (115). In response to accessing the catalogue, the second messaging application (135) uses the message identifier to determine a storage device on which the message is stored. In the example herein, the catalogue associates the message identifier with a log identifier associated with the first log (140) and a location identifier (e.g. an RBA) associated with a location in the first log (140). The second messaging application (135) uses the log identifier and the location identifier to access the message from the first log (140).

Once the "get" is completed, the generator (215) generates an instruction for instructing the first messaging application (115) to delete the pointer. Preferably, the transmitter (220) transmits the instruction to the first messaging application (115).

Preferably, if a message is transactional, if the second messaging application (135) can access a pointer on the queue, the associated message has been committed. Typically, log writes to a log are forced during commit processing when a transactional protocol is used and thus, the second messaging application (135) can access the message safely.

Advantageously, log accesses are less costly, in performance terms than database accesses.

Furthermore, advantageously, this embodiment exploits existing technology wherein typically, one messaging application is operable to access a log associated with another messaging application. Furthermore, advantageously, this embodiment exploits existing technology as a persistent message is already typically stored in a log. Furthermore, advantageously, the coupling facility operates on the pointer as if it was a standard message and thus requires no associated modifications.

Furthermore, advantageously, as one messaging application is operable to access a log associated with another messaging application, this embodiment provides for high availability also.

It should be understood, that in this embodiment, each message (e.g. a persistent message or a non persistent message) is forcibly stored in the log if its associated message size exceeds the threshold.

A process associated with "long-lived" messages will now be described.

Typically, when a log is full, data in the log is "offloaded" onto an offload storage device (e.g. tape). If a message remains unconsumed for an extended period and the message is offloaded, a messaging application has to get the message from the offload storage device. Accessing a message from offload storage device takes time (e.g. because tape has to be manually mounted or even retrieved first of all from a remote site).

The embodiment provides an optimization addressing this problem.

At step 350, if a determination is made (by the first messaging application (115)) that the log is not full and thus, that an offload step does not need to be performed, the process ends.

If a determination is made (by the first messaging application (115)) that the log is full and thus, that an offload step may need to be performed, preferably, for each message, the first messaging application (115) checks an associated message identifier against the queue to determine whether a pointer associated with the message is in the queue. Preferably, if the pointer is not in the queue, no further action is required over and above the typical archiving of data in a log. This is because if the pointer is not in the queue, a "get" has already been completed by the second messaging application (135) and thus the message is no longer required. Thus, there is no need for rapid retrieval of the message.

Preferably, if the pointer is in the queue, the first messaging application (115) determines that offload is required and is configurable to store data in the log in a more accessible offload storage device than for example tape (e.g. wherein the offload storage device comprises a database). Preferably, the first messaging application (115) is operable to determine (step 355) a suitable (e.g. available) offload storage device and to move messages from the log and store (step 360) the messages in the offload storage device during the offload process.

Preferably, the first messaging application (115) is operable to store a message in the offload storage device with an associated message identifier. Preferably, the first messaging application (115) updates its catalogue. In response, the process ends.

If the second messaging application (135) wishes to "get" the offloaded message, the second messaging application (135) retrieves the pointer from the queue and uses the catalogue identifier in the pointer to access the catalogue of the first messaging application (115). In response to accessing the catalogue, the second messaging application (135) uses the message identifier to determine a storage device on which the message is stored. In the example herein, the catalogue associates the message identifier with an offload storage device identifier associated with the offload storage device and a location identifier associated with a location in the offload storage device. The second messaging application (135) uses the offload storage device identifier and the location identifier to access the message from the offload storage device.

Alternatively, at step 355, the weight component (225) is used. The weight component (225) analyses the pointer in the queue and uses pre-configurable weight data (e.g. generated by an administrator, a system or in response to analysis of historical statistics associated with the system (100)), to determine (step 355) a suitable offload storage device.

Preferably, the weight component (225) analyses a class of data associated with the pointer in the queue (e.g. wherein the class is associated with message size or message priority etc.) and compares the data against the pre-configurable weight data. It should be understood that preferably the class can be configurable (e.g. wherein a particular class can be assigned to a particular queue).

In one example, the weight data is associated with a priority of a message. In the example herein, the weight data is associated with size data of a message. An example of the weight data is shown below:

Weight data:
If size <100 MB use database as offload storage device
If size >100 MB use disk as offload storage device In response, to determining (step 355) a suitable offload storage device, the weight component (225) generates and passes an instruction with the determined offload storage device to the transmitter (220) which transmits the instruction to the second messaging application (135). The second messaging application (135) uses the instruction to move messages from the log and store (step 360) the messages in the offload storage device.

Advantageously, using a weight component allows an offload storage device to be more accurately chosen. Furthermore, for example, for some types of message (e.g. a message having a relatively smaller size or a higher priority), a more accessible (e.g. higher performance; quicker to load) offload storage device can be chosen.

It should be understood that although an embodiment has been described with reference to a coupling facility, any number of devices for providing a facility for shared memory can be used.

Although in an embodiment, a message having an associated size that exceeds the threshold is stored in the first log (140) associated with a "putting" messaging application, it should be understood that the message can be stored in a log associated with any number of components.

Although in an embodiment, a messaging application has access to a log of another messaging application, it should be understood that in some environments this may not be the case (e.g. due to security restrictions). Thus, for example, if a first messaging application cannot access the log of a second messaging application, preferably, the first messaging application sends a request to the second messaging application for data from the log. In response, the second messaging application sends the data from its log to the first messaging application. Before sending the data, the second messaging application can pre-process the data (e.g. remove data marked as confidential). It should be understood that receiving the data from the second messaging application can be faster than the first messaging application reading the log of the second messaging application (e.g. if the log of the second messaging application is stored on a local disk to the second messaging application). Alternatively, the first messaging application is operable to receive the data from any number of other components (e.g. a proxy component that is logically separate from the second messaging application).

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

We claim:

1. A method, performed within and by a shared storage device separate from first and second messaging computer systems, comprising:
   receiving, from the first messaging computer system, a pointer to a first message stored within a first log owned by a first messaging application within the first messaging computer system;
   storing the pointer in the shared storage device;
   receiving, from the second messaging computer system, a request for the message;
   returning, to the second messaging computer system and responsive to the request, the pointer, wherein
   the first log is accessible by the second messaging computer system using the pointer, and
   access rights to the first log by the first messaging computer system are greater than access rights to the first log by the second messaging computer system.

2. The method of claim 1, wherein
   the first messaging application is configured to access a second log owned by the second messaging computer system; and
   access rights to the second log by the second messaging computer system are greater than access rights to the second log by the first messaging computer system.

3. The method of claim 1, wherein
   the pointer includes information configured to enable the second messaging computer system to access the first message within the first log.

4. The method of claim 3, wherein
   the information includes:
   (i) a message identifier associated with the first message, and
   (ii) a catalogue identifier associated with a catalogue of the first messaging application.

5. The method of claim 1, wherein
   the first message exceeds a predetermined threshold, and
   a second message from the first messaging application and not exceeding the predetermined threshold is stored within the shared storage device.

6. The method of claim 1, wherein
   the first and second messaging computer systems are configured to read and write messages to the shared storage device.

7. A shared storage device separate from first and second messaging computer systems, comprising:
   a hardware processor configured to initiate the following operations:
   receiving, from the first messaging computer system, a pointer to a first message stored within a first log owned by a first messaging application within the first messaging computer system;
   storing the pointer in the shared storage device;
   receiving, from the second messaging computer system, a request for the message;
   returning, to the second messaging computer system and responsive to the request, the pointer, wherein
   the first log is accessible by the second messaging computer system using the pointer, and
   access rights to the first log by the first messaging computer system are greater than access rights to the first log by the second messaging computer system.

8. The shared storage device of claim 7, wherein
   the first messaging application is configured to access a second log owned by the second messaging computer system; and
   access rights to the second log by the second messaging computer system are greater than access rights to the second log by the first messaging computer system.

9. The shared storage device of claim 7, wherein
   the pointer includes information configured to enable the second messaging computer system to access the first message within the first log.

10. The shared storage device of claim 9, wherein
    the information includes:

(i) a message identifier associated with the first message, and
(ii) a catalogue identifier associated with a catalogue of the first messaging application.

11. The shared storage device of claim 7, wherein the first message exceeds a predetermined threshold, and a second message from the first messaging application and not exceeding the predetermined threshold is stored within the shared storage device.

12. The shared storage device of claim 7, wherein the first and second messaging computer systems are configured to read and write messages to the shared storage device.

13. A computer program product, comprising:
a computer usable storage device having stored therein computer usable program code,
the computer usable program code, which when executed by a shared storage device separate from first and second messaging computer systems, causes the shared storage device to perform:
   receiving, from the first messaging computer system, a pointer to a first message stored within a first log owned by a first messaging application within the first messaging computer system;
   storing the pointer in the shared storage device;
   receiving, from the second messaging computer system, a request for the message;
   returning, to the second messaging computer system and responsive to the request, the pointer, wherein
the first log is accessible by the second messaging computer system using the pointer, and
access rights to the first log by the first messaging computer system are greater than access rights to the first log by the second messaging computer system.

14. The computer program product of claim 13, wherein the first messaging application is configured to access a second log owned by the second messaging computer system; and
access rights to the second log by the second messaging computer system are greater than access rights to the second log by the first messaging computer system.

15. The computer program product of claim 13, wherein the pointer includes information configured to enable the second messaging computer system to access the first message within the first log.

16. The computer program product of claim 15, wherein the information includes:
(i) a message identifier associated with the first message, and
(ii) a catalogue identifier associated with a catalogue of the first messaging application.

17. The computer program product of claim 13, wherein the first message exceeds a predetermined threshold, and a second message from the first messaging application and not exceeding the predetermined threshold is stored within the shared storage device.

18. The computer program product of claim 13, wherein the first and second messaging computer systems are configured to read and write messages to the shared storage device.

* * * * *